(12) United States Patent
Hall et al.

(10) Patent No.: US 10,214,959 B2
(45) Date of Patent: Feb. 26, 2019

(54) HEADRAIL OF A WINDOW COVERING WITH SAFETY DEVICE FOR ASSESSING THE STABILITY OF THE HEADRAIL MOUNTING

(71) Applicants: David R. Hall, Provo, UT (US); Emily Brimhall, Alpine, UT (US); Austin Carlson, Provo, UT (US); Mark Madsen, Provo, UT (US); Terrece Pearman, Draper, UT (US)

(72) Inventors: David R. Hall, Provo, UT (US); Emily Brimhall, Alpine, UT (US); Austin Carlson, Provo, UT (US); Mark Madsen, Provo, UT (US); Terrece Pearman, Draper, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/436,284

(22) Filed: Feb. 17, 2017

(65) Prior Publication Data

US 2018/0238107 A1  Aug. 23, 2018

(51) Int. Cl.
*E06B 9/323* (2006.01)
*H04Q 9/00* (2006.01)
*G08C 17/02* (2006.01)

(52) U.S. Cl.
CPC .............. *E06B 9/323* (2013.01); *G08C 17/02* (2013.01); *H04Q 9/00* (2013.01); *G08C 2201/51* (2013.01); *G08C 2201/93* (2013.01); *H04Q 2209/40* (2013.01); *H04Q 2209/823* (2013.01)

(58) Field of Classification Search
CPC .. E06B 9/323; E06B 9/50; A47H 1/13; A47H 1/12; A47H 1/122; A47H 1/124; A47H 1/022; A47H 1/08; H04Q 2209/40; H04Q 2209/823

USPC .............. 160/168.1 R, 173 R, 178.1 R, 902; 248/200.1, 265, 269, 270, 271, 272
See application file for complete search history.

(56) References Cited

U.S. PATENT DOCUMENTS

| | | | | |
|---|---|---|---|---|
| 1,350,221 A | * | 8/1920 | Griffin | A47H 1/13 248/252 |
| 1,752,472 A | * | 4/1930 | Whitney | A47H 1/022 211/123 |
| 2,181,101 A | * | 11/1939 | Spenard | E06B 9/325 160/178.1 R |

(Continued)

FOREIGN PATENT DOCUMENTS

DE    102010024486 B4 *  1/2016 ............... E06B 5/11

*Primary Examiner* — Daniel P Cahn
*Assistant Examiner* — Johnnie A. Shablack (57) ABSTRACT

The invention is an intelligent headrail for a window covering which includes an extensible end cap which applies force to the adjacent window or door frame to hold the headrail in place. The end cap includes a pressure sensor or a force sensing resistor to detect whether sufficient force is present to safely hold the headrail in place. The headrail may include a controller which is connected to the pressure sensor or a force sensing resistor. The controller may include program code which identifies the safety status of the window covering based on the pressure or force reading. The controller may include a data transmission port which transmits pressure or force readings to an output device. The program code may also send a report to the output device to indicate whether the force or pressure is moderately low or so low that the window covering is in danger of falling.

20 Claims, 6 Drawing Sheets

(56) References Cited

U.S. PATENT DOCUMENTS

| | | | | |
|---|---|---|---|---|
| 2,222,674 A * | 11/1940 | Lorentzen | E06B 9/323 | 160/178.1 R |
| 2,435,373 A * | 2/1948 | Van Buren | E06B 9/323 | 160/167 R |
| 3,110,506 A * | 11/1963 | O'Brien | B60P 7/15 | 211/105.6 |
| 3,156,294 A * | 11/1964 | Miller | E06B 9/325 | 160/173 R |
| 3,169,006 A * | 2/1965 | Lorentzen | E06B 9/323 | 248/262 |
| 3,541,844 A * | 11/1970 | Stover | G01L 1/22 | 73/761 |
| 4,373,569 A * | 2/1983 | Barettella | E06B 9/44 | 160/263 |
| 4,444,239 A * | 4/1984 | Haines | E06B 9/30 | 160/107 |
| 4,541,469 A * | 9/1985 | Dressell | B60J 1/2088 | 160/178.1 R |
| 4,601,319 A * | 7/1986 | Georgopoulos | B60J 1/2088 | 160/178.1 R |
| 4,666,106 A * | 5/1987 | Kohout | B64C 1/14 | 244/129.3 |
| 4,744,471 A * | 5/1988 | Leister | E04H 4/10 | 160/330 |
| 4,782,882 A * | 11/1988 | Amedeo | E06B 9/323 | 160/178.1 R |
| 4,848,432 A * | 7/1989 | Connolly | E06B 9/174 | 160/178.1 R |
| 5,156,281 A * | 10/1992 | Schwartz | A47H 1/022 | 211/105.3 |
| 5,242,065 A * | 9/1993 | Hoban | A47H 1/022 | 211/105.3 |
| 5,396,732 A * | 3/1995 | Andersen | E06B 9/02 | 49/255 |
| 5,460,215 A * | 10/1995 | Schon | E06B 9/262 | 160/178.1 R |
| 5,662,429 A * | 9/1997 | Battocchio | F16B 7/1418 | 248/354.5 |
| 5,676,415 A * | 10/1997 | Ament | B60R 5/047 | 160/238 |
| 5,732,992 A * | 3/1998 | Mauldin | A61F 2/461 | 269/134 |
| 5,769,293 A * | 6/1998 | Zaretsky | B60R 7/02 | 224/539 |
| 5,769,580 A * | 6/1998 | Purvis | B60P 7/15 | 410/143 |
| 6,186,214 B1 * | 2/2001 | Ladd | E06B 9/325 | 160/168.1 R |
| 6,210,090 B1 * | 4/2001 | Wyse | B60P 7/15 | 410/122 |
| 6,378,384 B1 * | 4/2002 | Atkinson | G01L 1/2231 | 73/862.474 |
| 6,470,948 B2 * | 10/2002 | Yates | E06B 9/0692 | 160/35 |
| 6,531,951 B2 * | 3/2003 | Serban | G01L 1/142 | 338/101 |
| 6,722,414 B2 * | 4/2004 | Nien | A47H 1/13 | 160/123 |
| 6,745,659 B1 * | 6/2004 | Cunningham | B23D 23/00 | 269/304 |
| 7,464,605 B2 * | 12/2008 | Douglas | A61B 5/1115 | 73/795 |
| 7,549,615 B2 * | 6/2009 | Shevick | E06B 9/266 | 160/168.1 R |
| 7,627,451 B2 * | 12/2009 | Vock | A43B 3/0005 | 702/178 |
| 7,740,046 B2 * | 6/2010 | Goodman | E05D 15/26 | 160/188 |
| 8,448,688 B2 * | 5/2013 | Goodman | E05D 15/26 | 160/188 |
| 8,596,594 B2 * | 12/2013 | Shevick | E06B 9/50 | 248/200.1 |
| 8,757,238 B2 * | 6/2014 | Goodman | E05D 15/26 | 160/188 |
| 9,089,236 B2 * | 7/2015 | Shevick | E06B 9/50 | |
| 9,328,906 B1 * | 5/2016 | Bennington | F21V 23/04 | |
| 9,410,367 B2 * | 8/2016 | Coker | E06B 9/323 | |
| 9,670,722 B1 * | 6/2017 | Hall | E06B 9/323 | |
| 9,926,740 B2 * | 3/2018 | Pham | E06B 9/42 | |
| 2005/0116424 A1 * | 6/2005 | Sanders | E06B 3/365 | 277/377 |
| 2007/0279046 A1 * | 12/2007 | Cavarec | E06B 9/68 | 324/207.13 |
| 2008/0028681 A1 * | 2/2008 | Andersen | E06B 9/04 | 49/13 |
| 2008/0197246 A1 * | 8/2008 | Belden | A47F 13/00 | 248/176.1 |
| 2008/0245940 A1 * | 10/2008 | Brown | A47H 1/022 | 248/251 |
| 2010/0276090 A1 * | 11/2010 | Zagone | E04G 21/30 | 160/368.1 |
| 2011/0031198 A1 * | 2/2011 | Trettin | A47H 1/022 | 211/123 |
| 2011/0133940 A1 * | 6/2011 | Margalit | E06B 3/66366 | 340/584 |
| 2013/0118080 A1 * | 5/2013 | Fink | E06B 7/20 | 49/31 |
| 2014/0086676 A1 * | 3/2014 | Coker | E06B 9/323 | 403/326 |
| 2015/0020984 A1 * | 1/2015 | Fennell | E06B 9/50 | 160/323.1 |
| 2015/0330143 A1 * | 11/2015 | Shevick | E06B 9/50 | 52/745.15 |
| 2017/0247942 A1 * | 8/2017 | Hall | E06B 9/323 | |
| 2017/0362889 A1 * | 12/2017 | Hall | E06B 9/323 | |

* cited by examiner

HEADRAIL OF A WINDOW COVERING WITH SAFETY DEVICE FOR ASSESSING THE STABILITY OF THE HEADRAIL MOUNTING

BACKGROUND

Field of the Invention

This disclosure relates to window coverings with intelligent headrails.

Background of the Invention

Window coverings may be mounted in a window or door frame by mounting the headrail in the window covering within the window or door frame. In some window coverings, the headrail is mounted by extending a section of an end cap within the headrail to apply force to the window or door frame. Over time, the mechanical parts of these end caps, which may include springs, may lose their strength. Alternatively, parts within the end cap may slip out of place. In either situation, the end cap may gradually apply less force to the window or door frame. This may cause the headrail to slip and be in danger of falling.

While some window covers may provide means for checking the mounting of the headrail, most users do not regularly check their window coverings. A window covering that detects when the force needed to keep the headrail in place is needed. Furthermore, an intelligent window cover is needed which alerts the user when the force is beginning to decrease or when the headrail is in danger of falling.

BRIEF SUMMARY OF THE INVENTION

We disclose a headrail for a window covering which senses when the pressure or force needed to keep the headrail mounted in a window or door frame is less than optimal or so low that the window covering is in danger of falling.

The headrail may include an end cap that, when mounted, extends toward the window or door frame. When extended, the end cap applies force to the window or door frame to hold the headrail in place. Over time, this force may gradually reduce and the headrail may need to be adjusted, remounted, or receive replacement parts.

The disclosed window coverings include either a pressure sensor or a force sensing resistor within the end cap. The pressure sensor or a force sensing resistor may be positioned between the mounting bracket and a part within the end cap that applies force to the mounting bracket. The pressure sensor or a force sensing resistor may take measurements which may be used to assess whether the force is sufficient to keep the headrail mounted or whether the headrail needs attention to prevent it from falling.

The pressure sensor or a force sensing resistor may be electronically connected to a controller which may be mounted within the headrail. The controller may include a memory with program code which may have been programmed to identify an optimal force or pressure, a suboptimal force or pressure, and a dangerously low force or pressure.

The controller may be electronically connected to an output device. In some embodiments, the controller may be connected to the output device through a wireless connection. In some embodiments, the output device may be a mobile device. The program code may send a signal to the output device reporting the force or pressure applied to the mounting bracket and whether the pressure is optimal, suboptimal, or dangerously low. The program code may receive user input to name multiple headrails which are connected to the same output device and include the identity in the report sent to the output device.

DETAILED DESCRIPTION OF THE INVENTION

Definitions

Window covering, as used herein, means an apparatus for controlling light and heat transmission through a window, door, or other opening in a building, including blinds with slats and roller shades.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a headrail with a safety device for assessing the stability of the headrail mounting by sensing when the pressure or force needed to keep the headrail mounted in a window or door frame is less than optimal or so low that the headrail is in danger of falling. The disclosed headrail may be attached to a window covering. The headrail on the window covering may be mounted to the window or door frame using a headrail with an extensible end cap as disclosed in U.S. patent application Ser. No. 15/072,562 filed on Mar. 17, 2017 which is hereby incorporated by reference in its entirety. The headrail disclosed herein may have a first and second end, one or both of which may include an embodiment of the extensible end cap assembly disclosed in patent application Ser. No. 15/072,562. The extensible end cap assembly may include a piston which may contain at least one spring, each of which may have a first end and a second end. The piston may also include a mounting bracket which may be attached to the first end of each of the at least one spring. The at least one spring may apply pressure to the mounting bracket when the at least one spring is compressed. The extensible end cap assembly may also include a floating bearing which is connected to the second end of the at least one spring. In addition, the extensible end cap assembly may include a crankshaft which may be connected to the floating bearing. Upon rotation, the crankshaft may either compress or extend the at least one spring.

The disclosed headrail may also include a lever arm which may be connected to the floating bearing such that the lever arm may rotate the crankshaft. Rotating the crankshaft may cause the crankshaft to push against the piston when the lever arm is in a first position. This may cause the piston to extend outward and create a compression fit between the headrail and a window or door casing.

The headrail may also include a pressure sensor which may be connected to the piston. The pressure sensor may detect the amount of pressure applied by the piston to a mounting bracket, and thus may be able to detect when the mechanical components of the headrail may be wearing out and/or may no longer be able to support the headrail. The pressure sensor may consist of one or more of the following: a strain gage pressure transducer, variable capacitance pressure transducer, and piezoelectric pressure transducer.

Alternatively, in other embodiments the headrail may include a force sensing resistor which may be connected to the piston. The force sensing resistor may detect the amount of force applied by the piston to a mounting bracket, and thus may be able to detect when the mechanical components of the headrail may be wearing out and/or may no longer be able to support the headrail. For example, the headrail may need 50-200 pounds of force in order to stay safely mounted. Some embodiments of the headrail include a controller as described in more detail below. If the pressure sensor or force sensing resistor measured a force at or below 50 pounds, it may send a signal to the controller. The controller may send a signal to an output device indicating the amount of force that the headrail is exerting on the window casing and that the headrail is in danger of falling. If the optimal force for the headrail is 150 pounds, and the pressure sensor or force sensing resistor measures a force at or below 150 pounds, it may send a signal to the controller, which may send a signal to the output device indicating the amount of force that the headrail is exerting on the window casing and that the headrail may need to be adjusted. In some environments, the window casing may swell in response to climate fluctuations. If the pressure sensor or force sensing resistor measured greater than 200 pounds of force, the controller may send a signal to the output device indicating potential over-pressuring of the system. In one embodiment, the force sensing resistor may be screen printed on the mounting bracket.

In some embodiments, the headrail may also include a controller which may be electrically connected to the pressure sensor or the force sensing resistor. The controller may include a memory which may contain a program code. The controller may also include a data transmission port. The data transmission port which may enable the program code to send a signal to an output device when the controller receives a signal from the pressure sensor or force sensing resistor that is below a defined value. In some embodiments, the output device may be a mobile device. The output device may be programmed to interpret the signal it receives from the controller and indicate whether the headrail is safely mounted, needs adjustment, or is in danger of falling. The output device may also report the pressure or force measurement from the pressure sensor or force sensing resistor. The data transmission port may send a wireless transmission to the output device.

Figure 1:
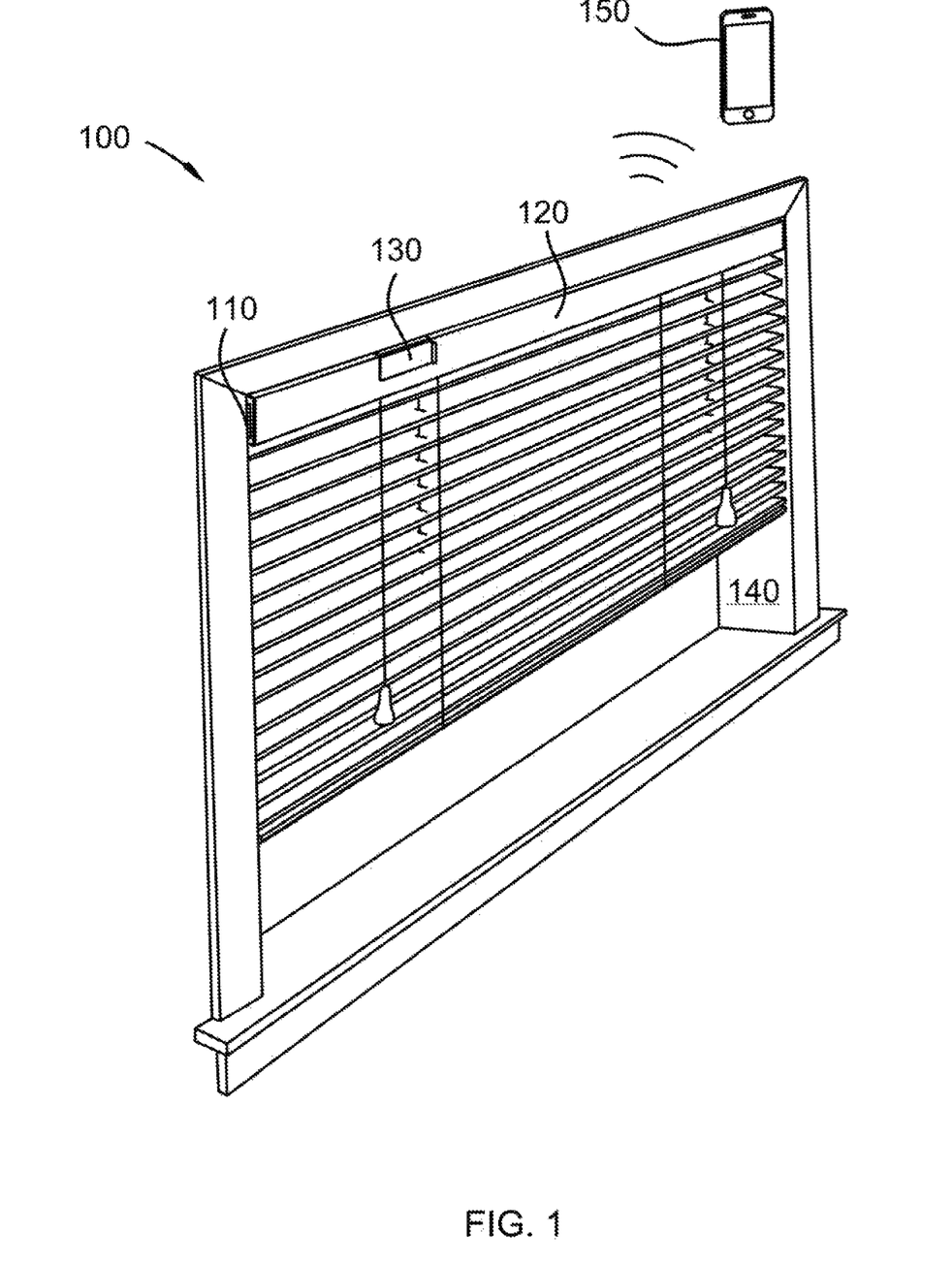
FIG. 1 is a perspective view of a window with a window covering that includes the disclosed headrail installed.

Referring now to the drawings, FIG. 1 illustrates window covering 100 which includes an embodiment of the disclosed headrail. Window covering 100 is shown mounted in window frame 140. Window covering 100 is a window blind that includes end cap 110 on headrail 120. Lever arm 130 is also included in headrail 120. Lever arm 130 may be used to move parts within end cap 110, which are described in more detail elsewhere herein, causing end cap 110 to extend creating compression against the inside of the window frame 140. In this embodiment, the compression retains the window covering 100 within the window frame 140.

Mobile device 150 is shown to be in wireless communication with components within headrail 120. As described in more detail below, headrail 120 may include a controller which may send signals to an output device, which may be a user's mobile device, which indicate the status of the mounting of window covering 100.

Figure 2A:
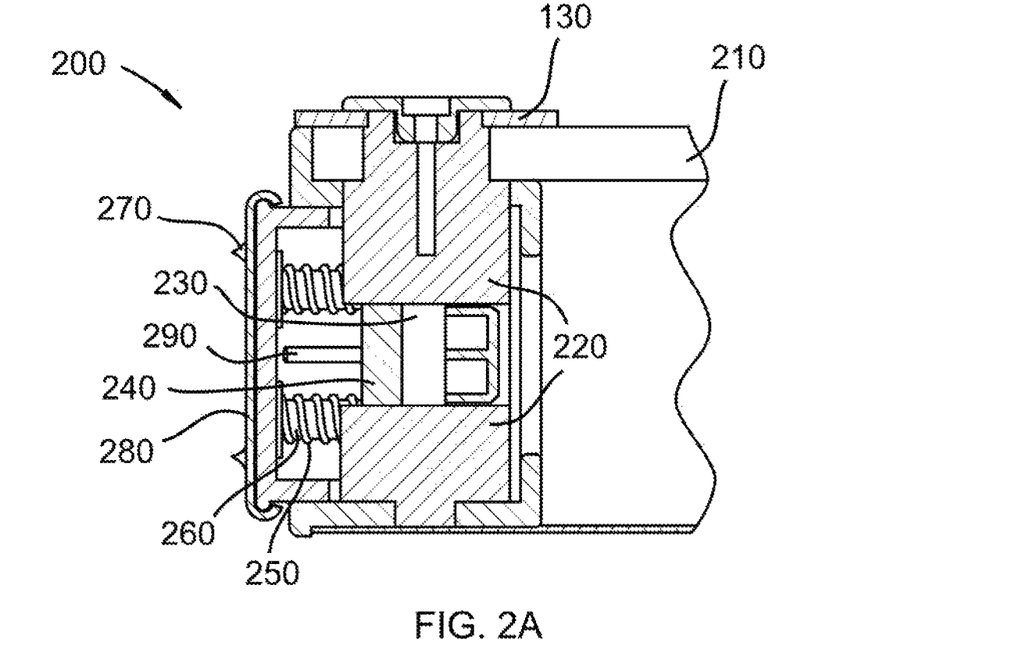
FIG. 2A illustrates a cross-sectional view of an embodiment of an end cap with a retracted piston and a pressure sensor according to an embodiment of the disclosed window covering.
Figure 2B:
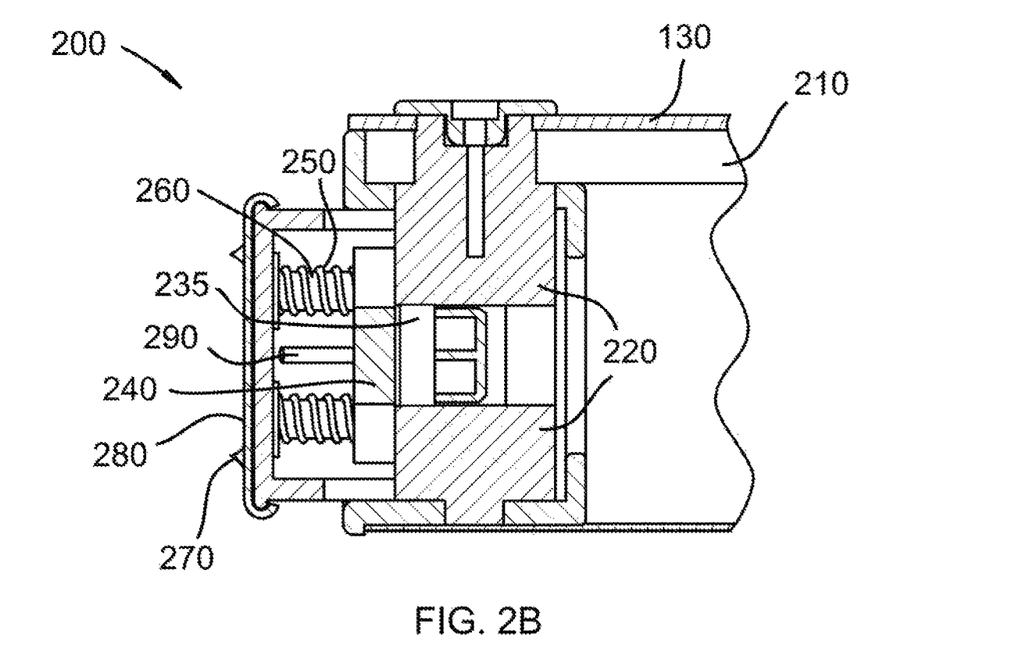
FIG. 2B is a perspective view which illustrates the end cap of FIG. 2A with an extended piston.

FIGS. 2A and 2B each show a cross-sectional view of end cap 200, which is an embodiment of an end cap which may be included in the disclosed headrail. End cap 200 is shown on an end of headrail 210.

FIG. 2A illustrates end cap 200 in a retracted position as it may be before headrail 210 is mounted in a window frame. A portion of lever arm 130 is shown in a first position which results in the retracted position of end cap 200. Lever arm 130 rotates crankshaft 220 which, in FIG. 2A, is in position 230. When lever arm 130 is turned 90 degrees, crankshaft 220 transfers that motion into rotational movement and causes floating bearing 240 to move toward mounting bracket 280 (toward the left in FIG. 2A). This compresses springs 250 which are wound around guide pins 260. The compression creates force that is transmitted to mounting bracket 280. The force may hold headrail 210 in place within the window frame. In addition, mounting bracket 280 includes barbs 270 which may penetrate the surface of the window frame as the force from the compression increases providing additional means for holding headrail 210 securely in the window frame.

FIG. 2B illustrates end cap 200 in an extended position as it may be when headrail 210 is mounted in a window frame. Lever arm 130 is shown having been moved 90 degrees causing crankshaft 220 to rotate to position 235. This movement forces floating bearing 240 to move toward mounting bracket 280 as described above. Springs 250 compress creating force against mounting bracket 280 which force barbs 270 into the surface of the window frame and create force which holds headrail 210 in the window frame.

Pressure sensor 290 is shown in both FIGS. 2A and 2B. In this embodiment, pressure sensor 290 is positioned between floating bearing 240 and mounting bracket 280 so as to sense the change in pressure between the two parts. In FIG. 2A, end cap 200 is in a retracted position so pressure sensor 290 will sense little pressure. In contrast, in FIG. 2B, end cap 200 is in an extended position. Assuming headrail 210 is mounted within a window frame in FIG. 2B, pressure sensor 290 will sense an increased amount of pressure relative to FIG. 2A.

Figure 3A:
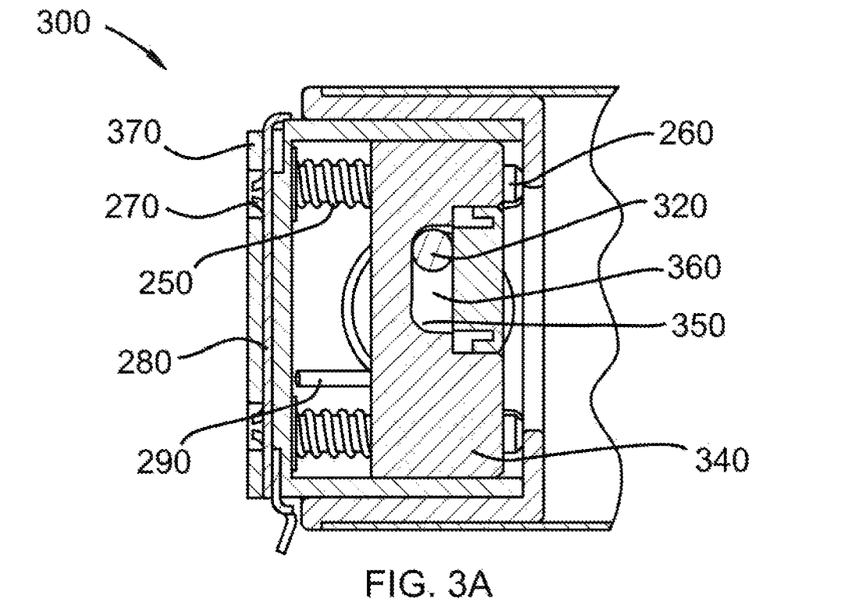
FIG. 3A is a perspective view which illustrates a cross-sectional view of another embodiment of an end cap in a retracted piston and a pressure sensor according to an embodiment of the disclosed headrail.
Figure 3B:
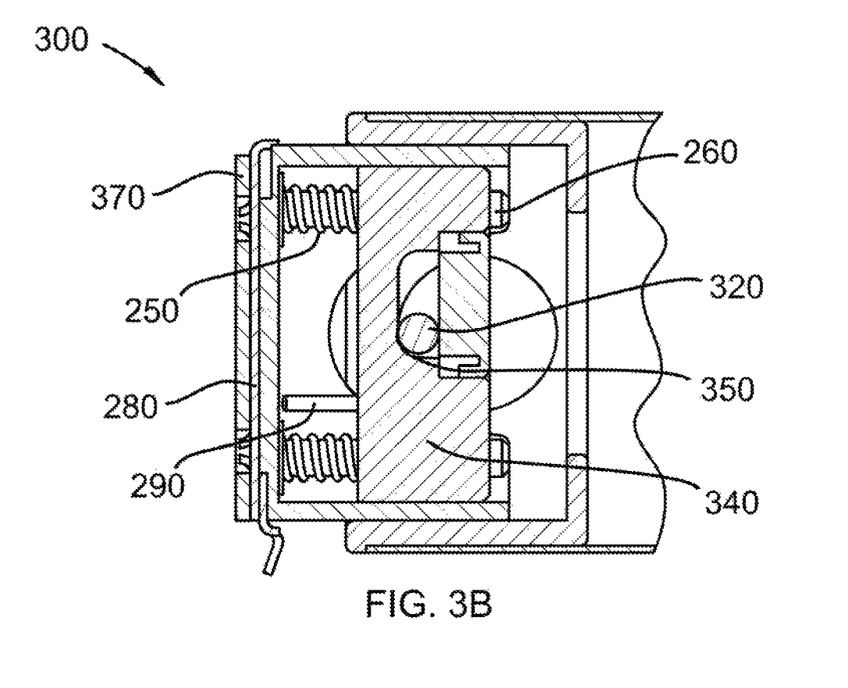
FIG. 3B is a perspective view which illustrates the end cap of FIG. 3A with a piston in an extended position.

FIGS. 3A and 3B illustrate end cap 300 which is another embodiment of an end cap which may be included in the disclosed headrail. FIG. 3A shows end cap 300 in a retracted position while FIG. 3B shows end cap 300 in an extended position as when mounted in a window frame.

FIG. 3A shows crankshaft 320 in a first position. A lever arm may be connected to crankshaft 320 to rotate it between a first and second position. Floating bearing 340 includes track 360 along which crankshaft 320 moves. Track 360 includes grooved inset 350 into which crankshaft 320 may lock and be held in place when the headrail is mounted in a window frame and crankshaft 320 is moved to a second position as shown in FIG. 3B. When crankshaft 320 moves from a first position as shown in FIG. 3A to a second position as shown in FIG. 3B, crankshaft 320 applies force to floating bearing 340 which moves floating bearing 340 toward mounting bracket 370 (to the left in the drawing). This movement applies force which compresses springs 250 which wrap around guide pins 260.

FIG. 3B shows end cap 300 in an extended position as it may be positioned when the headrail is mounted in a window frame. Lever arm (not shown) has been moved 90 degrees causing crankshaft 320 to move from a first position as shown in FIG. 3A to a second position. This transfers force to move floating bearing 340 applying force to springs 250. The force is then transferred to mounting bracket 370. The compression holds the headrail in the window frame. Like end cap 200 of FIGS. 2A and 2B, end cap 300 includes barbs 270 which may pierce the surface of the window frame to help hold the headrail in place.

Pressure sensor 290 is shown in both FIGS. 3A and 3B. In this embodiment, pressure sensor 290 is positioned between floating bearing 340 and mounting bracket 280 so as to sense the change in pressure between the two parts. In FIG. 3A, end cap 300 is in a retracted position so pressure sensor 290 will sense relatively little pressure. In FIG. 3B, end cap 300 is in an extended position. Assuming the headrail in which end cap 300 is positioned is mounted within a window frame in FIG. 3B, pressure sensor 290 will sense an increased amount of pressure relative to FIG. 3A.

Figure 4A:
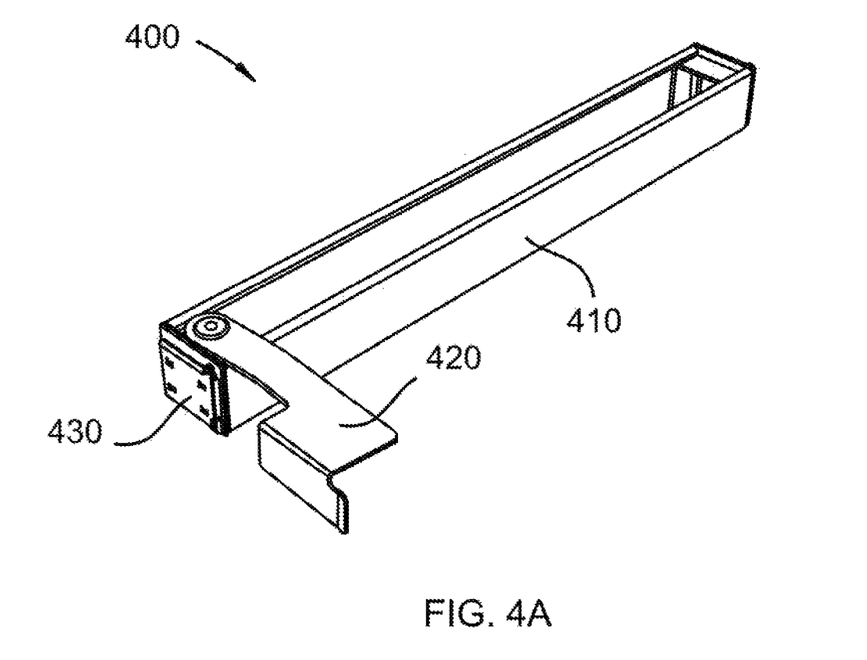
FIG. 4A is a perspective view which illustrates an embodiment of the headrail of the disclosed window covering with a lever arm in a first position.
Figure 4B:
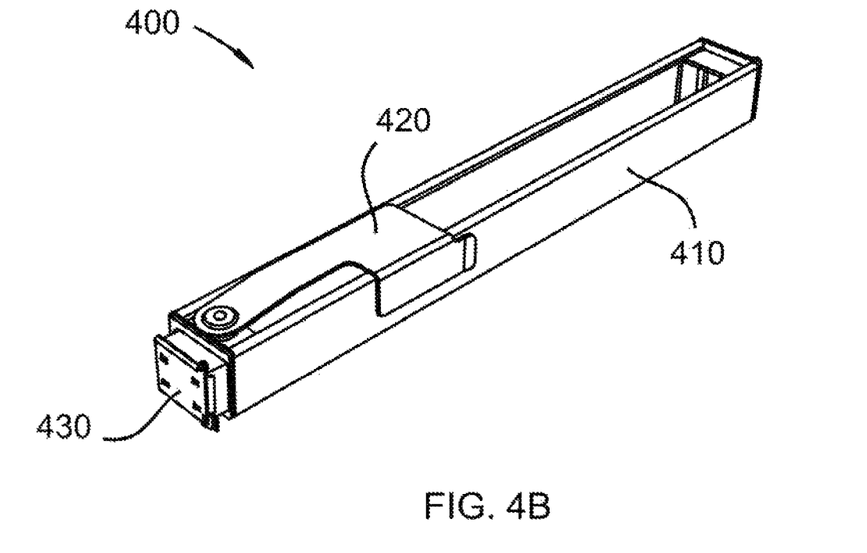
FIG. 4B is a perspective view which illustrates the headrail of FIG. 4A with the lever arm in a second position.

FIG. 4A illustrates embodiment 400 which includes headrail 410 with end cap 430 in a retracted position. FIG. 4B shows embodiment 400 with end cap 420 in an extended position as when mounted in a window frame. Lever arm 410 is shown in FIG. 4A in a first position which is perpendicular to headrail 410. In FIG. 4B, lever arm 410 has been moved 90 degrees so that lever arm 410 is parallel to headrail 410. End cap 420 may be the embodiment shown in FIGS. 2A, 2B, 3A, 3B, or other embodiments of end caps that are within the scope of this disclosure. Moving lever arm 410 as shown in FIGS. 4A and 4B may modulate the force applied to end cap 420 and which may be sensed by a pressure sensor or force sensing resistor.

Figure 5:
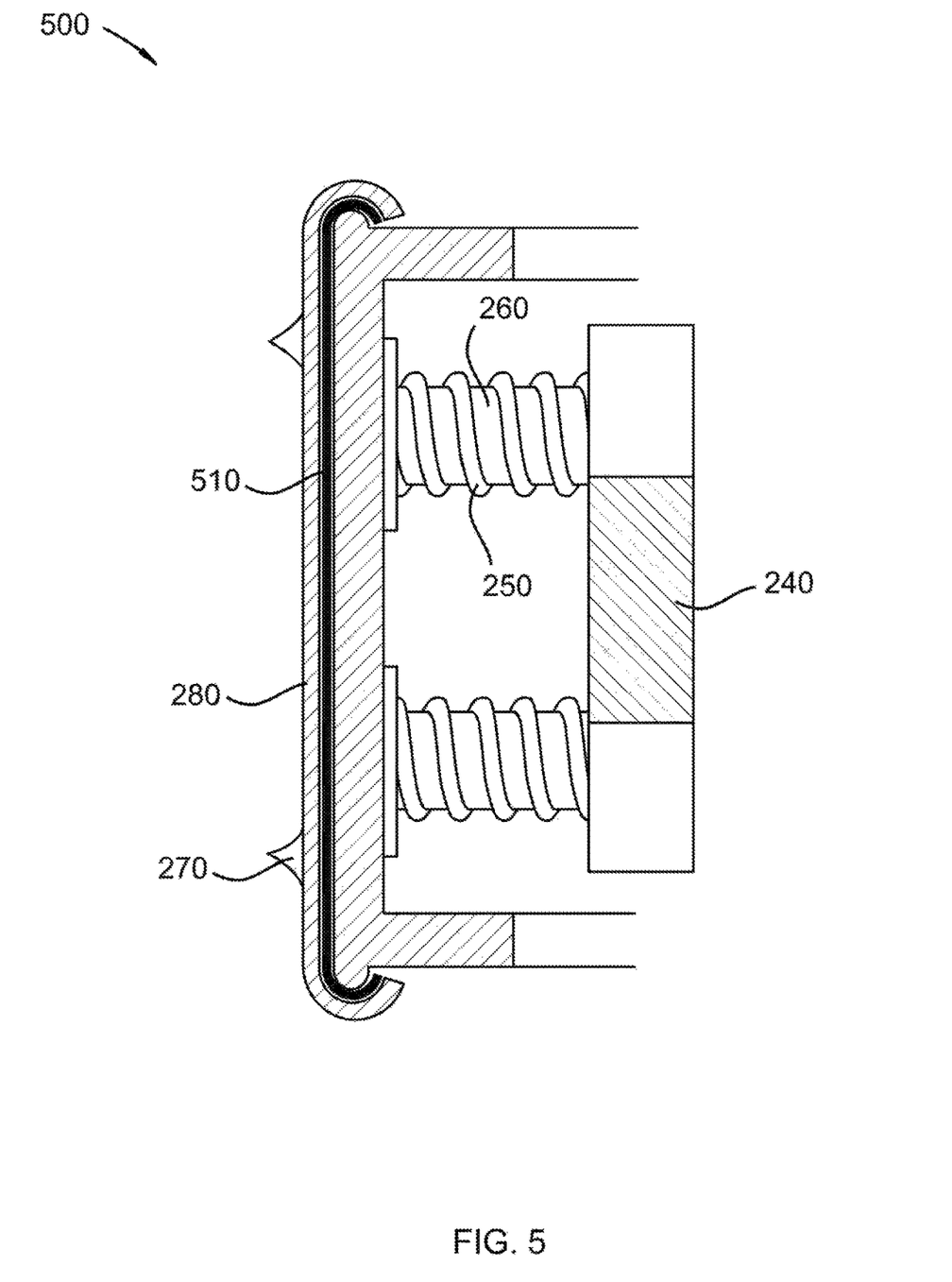
FIG. 5 is a cross-sectional view which illustrates an embodiment of an end cap with a force sensing resistor screen printed on the mounting bracket.

FIG. 5 illustrates end cap 500 which shows floating bearing 240 applying force to springs 250 which are wound around guide pins 260. The force is transferred to mounting bracket 280 causing barbs 270 to pierce the surface of the adjacent window frame. End cap 500 further includes force sensing resistor 510 which, in this embodiment, is a thin layer beneath mounting bracket 280. Force sensing resistor 510 detects the force applied to mounting bracket 280. In FIG. 4A, the force detected by force sensing resistor 510 will be less than in FIG. 4B in which end cap 500 is in an extended position.

Figure 6:
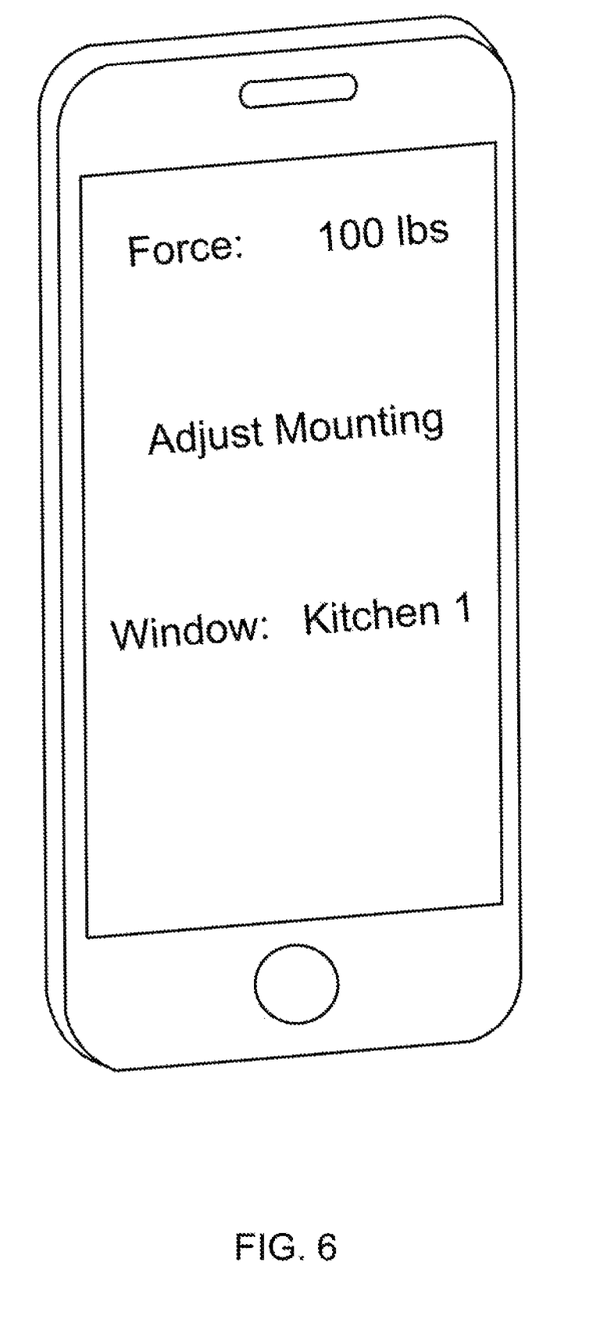
FIG. 6 illustrates an embodiment of an output device which may be included in an embodiment of the disclosed window covering.

FIG. 6 shows an output device which, in this embodiment, is a mobile device. In the embodiments of the headrail disclosed herein, a controller may be positioned within the headrail. The controller may be in electronic connection with the pressure sensor or the force sensing resistor in the end cap of the headrail. The controller may receive pressure or force readings from the pressure sensor or force sensing resistor respectively. The controller may include a memory which includes program code and a wireless data communication port. The controller may send pressure or force readings through a data transmission port to an output device to alert the user that the headrail force or pressure is low and needs to be adjusted for safety or that the headrail is in danger of falling. In some embodiments of the disclosed window covering, the ideal force for a mounted headrail is about 150 pounds of force. In the embodiment shown in FIG. 6, the controller has received a reading from a force sensing resistor that the force applied to the mounting bracket is 100 pounds. The controller has sent a signal to the mobile device shown in FIG. 6 reporting the pounds of force and that the user should adjust the mounting so that the headrail is secure. In this embodiment, the user has installed multiple window covers which report to the mobile device. The user has provided input to the program code to provide a name for each window covering based on its location. The report to the mobile device indicates that the report is for a window in the kitchen which the user has chosen to call Kitchen 1. The user has now been alerted that the headrail of the window covering in the kitchen called "Kitchen 1" should be adjusted before it falls from the window frame.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

The invention claimed is:

1. A headrail with a safety device for assessing the stability of a headrail mounting comprising:
 a first end and a second end of the headrail;
 an extensible end cap assembly disposed at least at the first end of the headrail,
 the extensible end cap assembly comprising:
  a piston, the piston comprising at least one spring, and a mounting bracket, wherein each of the at least one spring comprises a first end and a second end, wherein the first end of each of the at least one spring is connected to and applies pressure to the mounting bracket when the at least one spring is compressed;
  a floating bearing, wherein the floating bearing is connected to the second end of the at least one spring;
  a crankshaft, wherein the crankshaft is connected to the floating bearing, and wherein, upon rotation, the crankshaft either compresses or extends the at least one spring;
 a lever arm, wherein the lever arm is connected to the crankshaft, wherein the lever arm rotates the crankshaft causing the crankshaft to push against the piston thereby compressing the at least one spring when the lever arm is in a first position to thus create a compression fit between the mounting bracket and a window casing in which the headrail is mounted;

a pressure sensor, wherein the pressure sensor is connected to the piston and contacts the mounting bracket and wherein the pressure sensor detects the amount of pressure applied by the piston to the mounting bracket.

2. The headrail of claim 1, wherein the pressure sensor consists of one of the following: a strain gage pressure transducer, variable capacitance pressure transducer, and piezoelectric pressure transducer.

3. The headrail of claim 1, further comprising a controller, wherein the controller is electrically connected to the pressure sensor.

4. The headrail of claim 3, wherein the controller comprises a memory, wherein the memory comprises program code.

5. The headrail of claim 4, wherein the controller further comprises a data transmission port.

6. The headrail of claim 5, wherein the program code sends a signal through the data transmission port to an output device when the controller receives a signal from the pressure sensor that is below a defined value.

7. The headrail of claim 6, wherein the output device uses the signal from the pressure sensor to indicate whether the headrail is safely mounted, needs adjustment, or is in danger of falling.

8. The headrail of claim 6, wherein the output device reports a pressure measurement between the piston and the mounting bracket.

9. The headrail of claim 6, wherein the signal is a wireless transmission.

10. The headrail of claim 9, wherein the output device is a mobile device.

11. A headrail with a safety device for assessing the stability of a headrail mounting comprising:
a first end and a second end of the headrail;
an extensible end cap assembly disposed at least at the first end of the headrail,
the extensible end cap assembly comprising:
a piston, the piston comprising at least one spring, and a mounting bracket, wherein each of the at least one spring comprises a first end and a second end, wherein the first end of each of the at least one spring is connected to and applies pressure to the mounting bracket when the at least one spring is compressed;
a floating bearing, wherein the floating bearing is connected to the second end of the at least one spring;
a crankshaft, wherein the crankshaft is connected to the floating bearing, and wherein, upon rotation, the crankshaft either compresses or extends the at least one spring;
a lever arm, wherein the lever arm is connected to the crankshaft, wherein the lever arm rotates the crankshaft causing the crankshaft to push against the piston thereby compressing the at least one spring when the lever arm is in a first position to thus create a compression fit between the mounting bracket and a window casing in which the headrail is mounted;
a force sensing resistor, wherein the force sensing resistor is connected to the piston and wherein the force sensing resistor detects the amount of force applied by the piston to the mounting bracket.

12. The headrail of claim 11, wherein the force sensing resistor is screen printed on the mounting bracket.

13. The headrail of claim 11, further comprising a controller, wherein the controller is electrically connected to the force sensing resistor.

14. The headrail of claim 11, wherein the controller comprises a memory, wherein the memory comprises program code.

15. The headrail of claim 14, further comprising a data transmission port.

16. The headrail of claim 15, wherein the program code sends a signal through the data transmission port to an output device when the controller receives a signal from the force sensing resistor that is below a defined value.

17. The headrail of claim 16, wherein the output device uses the signal from the force sensing resistor to indicate whether the headrail is safely mounted, needs adjustment, or is in danger of falling.

18. The headrail of claim 16, wherein the output device reports a measurement from the force sensing resistor of the amount of force applied to the piston.

19. The headrail of claim 16, wherein the signal is a wireless transmission.

20. The headrail of claim 19, wherein the output device is a mobile device.

* * * * *